Jan. 26, 1937. A. F. BAUMBAUER ET AL 2,068,640
APPARATUS FOR THE RECOVERY OF VALUES FROM ALUMINUM
Filed Aug. 5, 1935 2 Sheets-Sheet 2
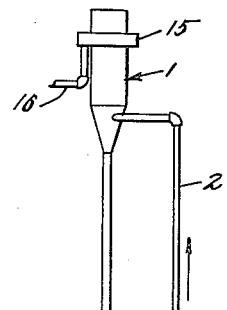
Fig. 2.
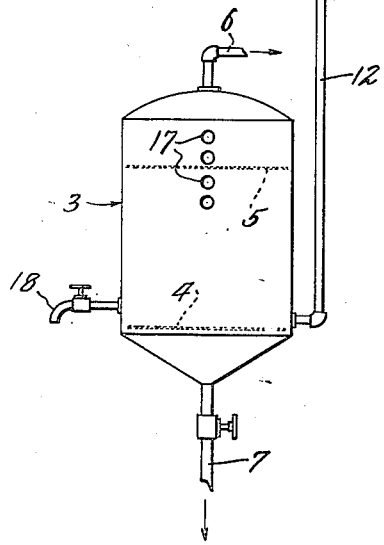
Fig. 3.
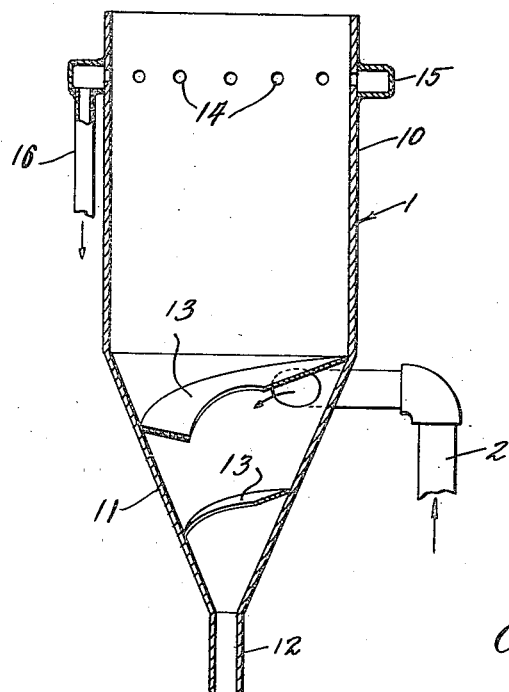
INVENTORS
Allen F. Baumbauer
William Culver
BY
Lyon & Lyon
ATTORNEYS Patented Jan. 26, 1937

2,068,640

UNITED STATES PATENT OFFICE 2,068,640

APPARATUS FOR THE RECOVERY OF VALUES FROM ALUMINUM

Allen F. Baumbauer and William Culver, Long Beach, Calif.; said Culver assignor to said Baumbauer Application August 5, 1935, Serial No. 34,776

7 Claims. (Cl. 23—267)

This invention relates to an apparatus for treating metallic aluminum in the form of scrap or the like, and containing varying quantities of pure aluminum, for the production of hydrogen gas, alumina (either in the form of hydrate or oxide), sodium aluminate, and the like.

Although it has been known for a great many years that sodium hydroxide solutions will react with metallic aluminum with the formation of hydrogen and sodium aluminate, this well known reaction has not been utilized heretofore in the recovery of values from scrap aluminum or metals containing aluminum, for economical reasons and the lack of equipment capable of handling the reagents and products in a ready, facile and economical manner.

The present invention is directed toward an arrangement of elements and the provision of means whereby metals containing aluminum may be economically utilized in the production of valuable products. The invention also provides means, reagents and conditions whereby the operation is facilitated.

An object of this invention, therefore, is to disclose and provide an arrangement for treating metals containing aluminum for the production of hydrogen and alumina therefrom.

Another object of the invention is to disclose and provide means for economically utilizing the reagents.

Other objects, uses and advantages of the invention will become apparent to those skilled in the art from the following detailed description. In such description, reference will be had to the appended drawings, in which:

Fig. 1 diagrammatically illustrates an arrangement of elements whereby the operation may be most economically carried out.

Fig. 2 is a side elevation of the gas generating unit.

Fig. 3 is an enlarged vertical section through the feeding device which forms a part of the gas generating unit.

Figure 1:
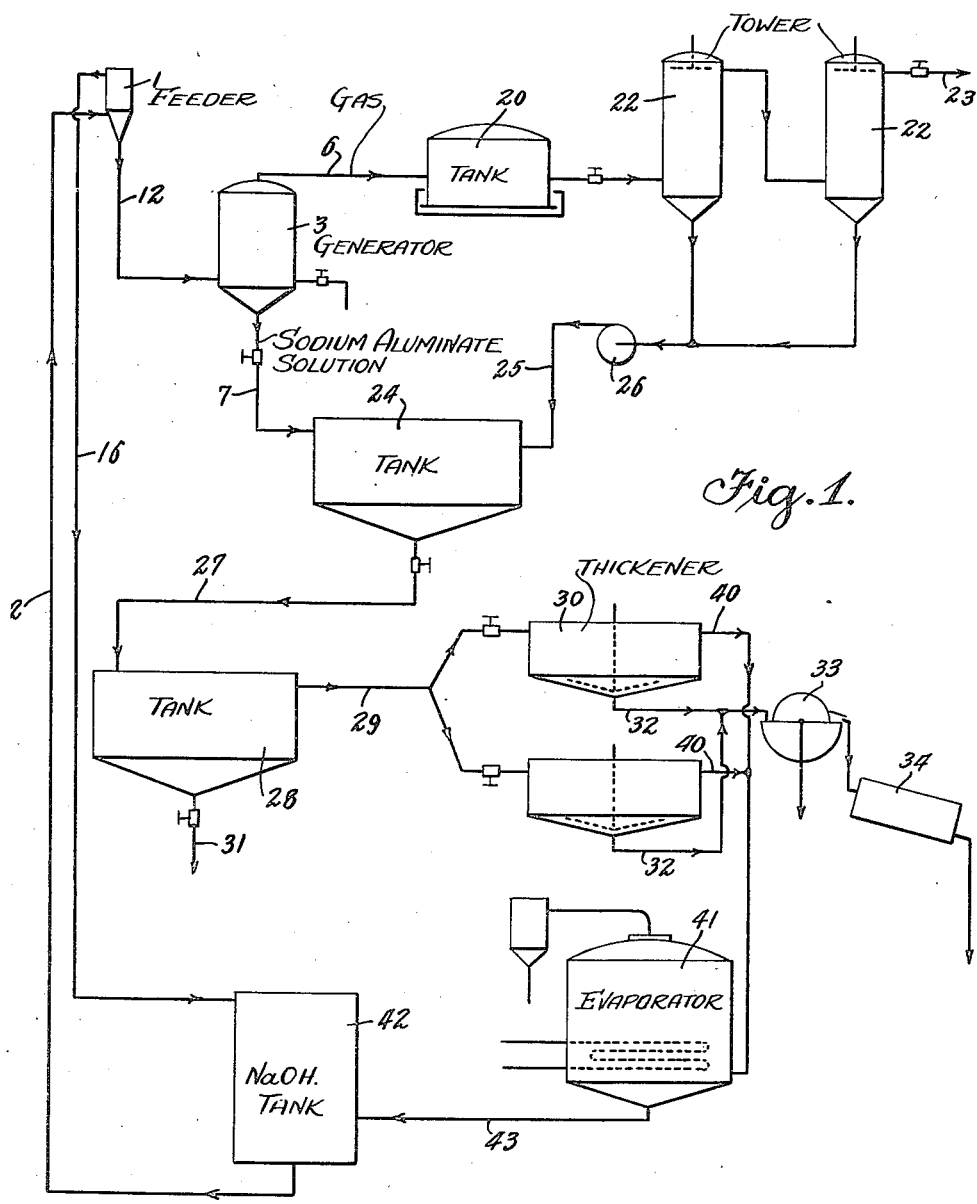

As shown in the drawings, the apparatus comprises a feeder 1 into which hot caustic soda solution is introduced by means of the line 2. Scrap aluminum-containing metal in relatively small pieces is also fed into the feeder 1 so that both the aluminum metal and caustic soda are introduced into a gas generator 3. The construction of the gas generator and feeder is more accurately shown in Figs. 2 and 3.

The gas generator 3 may be a cylindrical tank provided with a conical bottom and a domed top and provided with an iron grate in the lower portion as indicated at 4, and another grate positioned in the upper third of the tank, as indicated at 5. The dome is provided with a gas discharge line 6 whereas the cone bottom is provided with a valved outlet 7. The feeder preferably comprises a cylindrical portion 10 and a conical bottom 11, the bottom being connected by means of a line 12 with the lower portion of the generator 3 at a point immediately above the lower grate 4. The conical portion 11 of the feeder 1 is provided with a spiral baffle 13, the baffle being inclined downwardly and toward the center of the cone 11. A port or aperture extends through the baffle 13 and a hot caustic inlet line 2 discharges tangentially into the cone 11 at a point beneath the baffle 13. The cylindrical portion 10 may be provided with a series of apertures 14 leading into a manifold 15 provided with a caustic return line 16.

In operation, hot caustic solution discharges into the cone 11 beneath the baffle 13, forming a quiet whirlpool which draws down with it pieces of metal containing aluminum fed into the top, the cylindrical portion 10 discharging the mixture of aluminum metal and caustic through the line 12 into the gas generator 3 between the grates 4 and 5. The grates assist in retaining the solid metal within the generator, violent ebullition and reaction taking place therein. A plurality of vertically spaced observation windows 17 is provided in the generator 3 both above and below the grate 5 so that the height or thickness of foam within the generator may be visually observed. A sampling outlet 18 is provided in the lower portion of the generator 3 at a point above the grate 4. Gas discharged through the outlet 6 may lead to a bell tank 20 from which the gas is discharged as by line 21 into drying and scrubbing towers, indicated at 22, from whence the washed gas may be discharged by line 23 into suitable storage tanks, compressors, etc. The sodium aluminate solution, together with products of reaction taking place in the generator 3, is discharged by line 7 into a dilution tank 24 which is preferably of the dome top, cone bottom type. Water from the scrubbers 22 may be introduced into the dilution tank 24 by means of a line 25 and pump 26. The water inlet line 25 is preferably spaced from the bottom of the tank 24. The valved outlet 27 leading from the bottom of the tank 24 discharges into a settling tank 28 from whence the supernatant, partially clarified liquor is withdrawn by lines 29 into one end of a plurality of thickening tanks 30. Sediment may be withdrawn from the tank 28 by a valved bottom outlet 31.

The thickeners 30 may be provided with slow moving rakes or paddles. The thickened sludge may be discharged by lines 32 into a suitable filter 33, the solids being conveyed and passed into a drier 34. The drier 34 may be either heated by means of a jacket or may be of the direct fire type.

The substantially clear thickened solution discharged from the thickeners 30 by lines 40 is conveyed to a suitable concentrating unit, such as the evaporator 41. In the evaporator the relatively weak alkaline solution is concentrated to about 30% NaOH or to a specific gravity of approximately 1.33. The hot concentrated caustic soda solution may be discharged into a tank 42 by means of line 43 and supplied therefrom in desired quantities to the feeder 1 as by line 2.

In actual operation, a hot caustic soda solution containing about 30% NaOH is fed into the generator 3 through the feeding device 1. Simultaneously therewith, pieces of metal containing aluminum are fed into the hopper 10 of the feeding device 1. The feeding device 1 is located at a height above the generator 3 sufficient to maintain a pressure of from 6 to 10 pounds in the dome of the generator. In the event undue pressure develops in the dome, the caustic solution will back up into the cylinder 10 of the feeder 1 and be discharged through the apertures 14 into the manifold 15 from whence the excess caustic is permitted to run up line 16 into the caustic storage tank 42. Within the generator 3 a reaction takes place whereby sodium aluminate and hydrogen are formed. The reaction may be indicated as follows:

$$2Al + 2NaOH + 2H_2O = Na_2Al_2O_4 + 3H_2$$

The hydrogen is discharged by the line 6 into the tank 20 and then into the drier or scrubbing towers 22. The products of reaction, together with the partially spent alkaline solution, are discharged by line 7 into the dilution tank 24. In this tank the dilution causes the formation of caustic soda and aluminum hydrate as follows:

$$Na_2Al_2O_4 + 4H_2O = 2NaOH + Al_2O_3 \cdot 3H_2O$$

Although the formation of aluminum hydrate takes place in the tank 24, the material is maintained at a relatively elevated temperature therein and in the settling tank 28. Only coarse solids such as iron, etc., are discharged from the settling tank 28 by line 31. The fluid suspension of aluminum hydrate passes into the thickeners 30 wherein precipitation takes place, the weak caustic solution being withdrawn through line 40 whereas the aluminum hydrate passes out through the lines 32. The weak caustic soda solution is then reconcentrated in the effects 41 and returned to tank 42.

The aluminum hydrate passes into the filtering and washing units 33 and then into the driers 34. In such driers it has been found desirable to add a small quantity of calcium fluoride (say 1%) as otherwise the dehydrated or dried alumina $Al_2O_3$ dusts very excessively.

It will thus be seen that a compact, simple apparatus has been disclosed capable of converting metallic aluminum into hydrogen and either sodium aluminate, aluminum hydrate or aluminum oxide. In the operation of the process, the temperature of the caustic being supplied to the feeder 1 should be maintained above 220° F. for most economical operation. The caustic storage tank 42 may be dispensed with. The temperature in the dilution tank 24 as well as in the settling tanks and thickeners 28 and 30 should preferably be maintained at above 150° F.

The feeder 1 as stated hereinabove, is designed to permit either continuous or intermittent introduction of metallic aluminum into the generator without admission of air. The vortex means, such as the spiral baffles 13, produce a quiet whirlpool which permits the introduction of metallic aluminum without drawing in air, the cylindrical body portion 10 of the feeder being of sufficient height so that the liquid level therein is at all times above the baffles 13. It is to be understood that suitable pumps may be introduced at various points in the system as occasion requires. Furthermore, instead of using a sedimentation tank at 28, a continuous filter may be substituted therefor.

In conducting the process, it is desirable to maintain the molecular ratio between $Na_2O$ to $Al_2O_3$ at between 2.15 and 2.5. The extent of dilution and the rate of thickening in the settlers and thickeners 30 is controlled so that the suspension in the thickeners 30 is reduced to about 15° Bé., the dilute alkali solution discharged by line 40 being then concentrated to about 36° Bé. in the evaporators 41.

All changes and modifications coming within the scope of the appended claims are embraced thereby.

We claim:

1. In an apparatus for the treatment of metallic aluminum, the combination of: an enclosed generator provided with spaced horizontal grids, a gas outlet from the top and a liquid outlet from the bottom; feeder means for introducing hot caustic and pieces of metallic aluminum into the generator at a point adjacent the lower grid and between said grids; a dilution tank communicating with said liquid outlet from said generator; settling and thickening means; conduit means connecting said dilution tank with said settling and thickening means; means for discharging aluminum hydrate from said thickening means; an evaporating means; means for separately discharging caustic solution from said thickening means into said evaporating means; and means for conducting caustic from said evaporating means into said feeder means.

2. In an apparatus for the treatment of metallic aluminum, the combination of an enclosed generator provided with spaced horizontal grids, a gas outlet from the top and a liquid outlet from the bottom; a feeder means positioned above said generator and including a tangentially directed hot caustic inlet conduit and an outlet communicating with said generator at a point in the lower portion thereof but between said grids; a dilution tank communicating with the liquid outlet from said generator; settling and thickening means operably connected to said dilution tank; evaporating means; and conduit means for conveying dilute caustic from said thickening tanks to said evaporating means and for supplying said feeder means with concentrated caustic from said evaporating means.

3. In an apparatus of the character described, the combination of a cylindrical enclosed generator provided with spaced horizontal grids, a gas outlet from the top and a liquid outlet from the bottom; feeder means positioned above said generator and including a cylindrical body portion adapted to receive pieces of metallic aluminum, and a conical lower portion, conduit means connecting the conical lower portion with said generator at a point in the lower portion thereof but between said grids, means for tangentially introducing hot caustic solution into said conical portion; overflow means near the top of said cylindrical body portion, and means for conveying caustic from said overflow means into a hot caustic supply.

4. In an apparatus of the character described, the combination of a cylindrical enclosed generator provided with spaced horizontal grids, a gas outlet from the top and a liquid outlet from the bottom; feeder means positioned above said generator and including a cylindrical body portion adapted to receive pieces of metallic aluminum, and a conical lower portion, conduit means connecting the conical lower portion with said generator at a point in the lower portion thereof but between said grids, and means for tangentially introducing hot caustic solution into said conical portion.

5. In an apparatus for the treatment of metallic aluminum, the combination of: an enclosed generator provided with spaced horizontal grids, a gas outlet from the top and a liquid outlet from the bottom; feeder means for introducing hot caustic and pieces of metallic aluminum into the generator at a point adjacent the lower grid and between said grids; a dilution tank communicating with said liquid outlet from said generator; settling and thickening means; conduit means connecting said dilution tank with said settling and thickening means; and means for discharging aluminum hydrate from said thickening means.

6. In an apparatus of the character described, the combination of: a cylindrical enclosed generator provided with spaced horizontal grids, a gas outlet from the top and a liquid outlet from the bottom thereof; feeder means positioned above said generator and including a cylindrical body portion adapted to receive pieces of material containing aluminum, a conical lower portion, conduit means connecting the conical lower portion with said generator at a point in the lower portion thereof but between said grids, means for tangentially introducing hot caustic solution into said conical portion; a dilution tank communicating with said liquid outlet from said generator; settling and thickening means; conduit means connecting said dilution tank with said settling and thickening means; and means for discharging aluminum hydrate from said thickening means.

7. In an apparatus of the character described, the combination of a cylindrical enclosed generator provided with spaced horizontal grids, a gas outlet from the top and a liquid outlet from the bottom; feeder means positioned above said generator and including a cylindrical body portion adapted to receive pieces of metallic aluminum, and a conical lower portion, conduit means connecting the conical lower portion with said generator at a point in the lower portion thereof but between said grids, means for tangentially introducing hot caustic solution into said conical portion; a dilution tank communicating with said liquid outlet from said generator; settling and thickening means; conduit means connecting said dilution tank with said settling and thickening means; means for discharging aluminum hydrate from said thickening means; an evaporating means; means for separately discharging caustic solution from said thickening means into said evaporating means; and means for conducting caustic from said evaporating means into said tangential introducing means of said feeder.

ALLEN F. BAUMBAUER.
WILLIAM CULVER.